(No Model.)
F. C. WAGNER.
ELECTRICAL MEASURING INSTRUMENT.
No. 453,681.  Patented June 9, 1891.
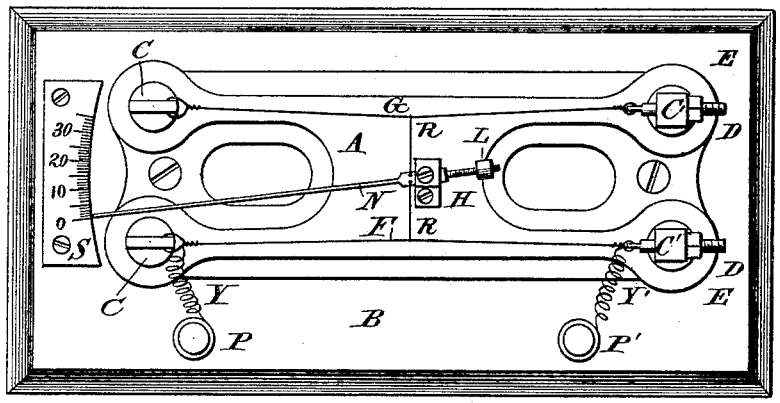
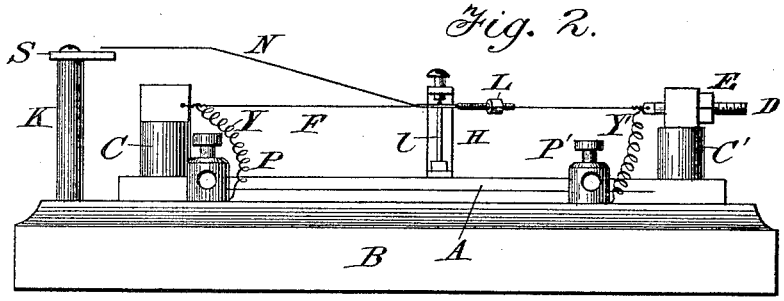
Witnesses
Clarence DePuy
Claunx G Taylor
Inventor
Frank C. Wagner

United States Patent Office.

FRANK C. WAGNER, OF ANN ARBOR, MICHIGAN.

ELECTRICAL MEASURING INSTRUMENT.

SPECIFICATION forming part of Letters Patent No. 453,681, dated June 9, 1891.

Application filed December 23, 1890. Serial No. 375,654. (No model.)

*To all whom it may concern:*

Be it known that I, FRANK C. WAGNER, a citizen of the United States, residing at Ann Arbor, county of Washtenaw and State of Michigan, have made a new and useful Invention in Electrical Measuring Instruments, of which the following is a specification.

My invention relates to that type of measuring devices which utilize the heating effects of a current of electricity, and is therefore applicable alike to the measurement of both direct and alternating currents of electricity.

The nature and object of my invention will be fully understood by referring to the following specification and accompanying drawings, and particularly pointed out in the claims at the end of said specification.

In the accompanying drawings, Figure 1 is a plan view of my improved electrical measuring instrument. Fig. 2 is a side elevation of the same.

B is the base of the instrument, to which is fastened the metallic frame-plate A.

C C and C' C' are posts of hard rubber or other suitable insulating material fastened securely to frame-plate A by screws from underneath.

F and G are two substantially similar and equal wires of the same metal, preferably of either German silver or platinoid, fastened rigidly at one end to posts C C and at the other to screw-bolts D D.

E E are nuts working upon screw-bolts D D and serving to adjust the tension upon the wires F and G. F and G are chosen of such size as to be sensibly heated by the passage of the current to be measured, and in the case of very small wires are preferably covered with silk or other non-heat-conducting material, to prevent the rapid loss of heat.

R R' are links connecting the middle points of the wires F and G, respectively, with the pointer N.

N is a pointer, preferably of aluminium, fastened to the shaft I and provided with an adjustable counterpoise L.

H is a bracket fastened to frame-plate A and furnishing pivot-bearings for shaft I.

S is a scale-plate supported by posts K, as shown.

P P' are binding-posts electrically connected, respectively, with the two sides of wire F by flexible cables Y and Y'.

The operation of my improved electrical measuring instrument is as follows: The electrical current to be measured enters, for example, at binding-post P, passes through cable Y to one end of wire F, thence through wire F, cable Y', binding-post P', and out. The current may traverse the instrument in the opposite direction without affecting the action in any respect. According to well-known laws the wire F will be heated by the passage of the electrical current to a degree depending upon the strength of the current passing, and a corresponding expansion of wire F will occur. Wires F and G, Fig. 1, being in a state of tension, the expansion of wire F under the heating action of the electrical current relieves the tension on wire F and allows the links R R' and the pointer N to move away from the zero position of wire F. The extent of this movement will obviously depend upon the strength of current flowing and will be perfectly definite for a given value of the current strength. The position of the pointer upon the scale can therefore be made to indicate by a proper calibration the current strength to be measured. By the use of wire G, Fig. 1, the effects of change of external temperature are eliminated, for whatever change in the tension of wire F is produced by a change of external temperature, due to the relative expansion of wire F and the frame-plate A or to a change in the elasticity of F, a corresponding change of tension is produced in wire G, and the resultant action upon the pointer will be *nil*.

A distinct advantage is claimed for this method of compensation for changes of external temperature over that employed by some other inventors—namely, to make the frame-plate of metal, which shall have the same coefficient of expansion as the actuating wire, for the following reason: When the instrument is carried from one place to another at a different temperature, the working wire will assume the temperature of its surroundings much more quickly than the frame-plate on account of its smaller mass, and an error is thereby introduced. In my method of compensation, on the other hand, the masses of the compensating parts are practically equal, and the error from this source is eliminated.

It is evident that the herein-described electrical measuring instrument can be used as a voltmeter by making the actuating-wire F of small diameter and placing in series with it a suitable resistance; or it may be used as an ammeter either alone or in combination with a suitable shunt, both of which combinations are well known to persons skilled in the art.

I am aware that the use of the heating action of an electrical current to measure the strength of said current is not original with me.

What I do claim as my invention, and desire to secure by Letters Patent of the United States, is—

1. In an electrical measuring instrument, the combination of two substantially similar and equal wires fixed at their extremities and mechanically connected transversely, so as to act in opposition to each other, with means for measuring the movement of said wires when only one of them is traversed by an electrical current.

2. In an electrical measuring instrument, the combination of two substantially similar and equal wires fixed at their extremities and connected at their middle points by links to a pivoted pointer, and a scale over which said pointer moves, as and for the purpose described.

FRANK C. WAGNER.

Witnesses:
L. D. CARR,
C. W. WAGNER.